United States Patent
Gan et al.

(10) Patent No.: US 10,662,722 B2
(45) Date of Patent: *May 26, 2020

(54) THREADED CONNECTIONS AND DOWNHOLE TOOLS INCORPORATING THE SAME

(71) Applicant: Schlumberger Technology Corporation, Sugar Land, TX (US)

(72) Inventors: Xiaoge Gan, Hoston, TX (US); Ke Chen, Houston, TX (US); Venkatesh Karuppiah, The Woodlands, TX (US); Anthony L. Collins, Houston, TX (US); Ke Ken Li, Sugar Land, TX (US); Fei Song, Sugar Land, TX (US); Rakesh Singh, Pune (IN); Michael Hui Du, Manvel, TX (US); Keith Moriarty, Houston, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/191,110

(22) Filed: Nov. 14, 2018

(65) Prior Publication Data
US 2019/0078398 A1  Mar. 14, 2019

Related U.S. Application Data

(63) Continuation-in-part of application No. 14/737,443, filed on Jun. 11, 2015.
(Continued)

(51) Int. Cl.
*E21B 17/042* (2006.01)
*F16L 15/06* (2006.01)
*E21B 10/42* (2006.01)

(52) U.S. Cl.
CPC ............ *E21B 17/042* (2013.01); *E21B 10/42* (2013.01); *F16L 15/06* (2013.01)

(58) Field of Classification Search
CPC ........ E21B 17/042; F16L 15/001; F16L 15/06
(Continued)

(56) References Cited

U.S. PATENT DOCUMENTS

| 3,953,996 A | 5/1976 | Chernock |
| 3,996,780 A | 12/1976 | German |

(Continued)

FOREIGN PATENT DOCUMENTS

| CN | 201768860 U | 3/2011 |
| CN | 201865594 U | 6/2011 |

(Continued)

OTHER PUBLICATIONS

International Search Report and Written Opinion issued in International Patent Application No. PCT/US2015/035527 dated Aug. 26, 2015, 13 pages.

(Continued)

*Primary Examiner* — Frederick L Lagman (57) ABSTRACT

A thread structure in accordance to one or more embodiments includes a thread extending helically along a portion of a bit body in spaced thread turns, the thread having a crest extending between a first flank and a second flank and a root extending between the thread turns, the root having a curvature defined by a portion of an ellipse tangentially adjoining the first and second flank at respective flank transition points, the ellipse having a major axis extending parallel to the axis and a minor axis extending perpendicular to the major axis and through a root bottom.

20 Claims, 6 Drawing Sheets

Related U.S. Application Data (60) Provisional application No. 62/012,232, filed on Jun. 13, 2014.

(58) Field of Classification Search
USPC .................................................. 285/333, 334
See application file for complete search history.

(56) References Cited

U.S. PATENT DOCUMENTS

| | | | |
|---|---|---|---|
| 4,411,147 | A | 10/1983 | Capuano |
| 4,799,844 | A | 1/1989 | Chuang |
| 4,861,210 | A | 8/1989 | Frerejacques |
| 5,056,611 | A | 10/1991 | Yousef et al. |
| 5,163,523 | A | 11/1992 | Yousef et al. |
| 5,427,418 | A | 6/1995 | Watts |
| 6,030,004 | A | 2/2000 | Schock et al. |
| 6,196,598 | B1* | 3/2001 | Yao .................... E21B 17/0426 285/333 |
| 6,447,025 | B1* | 9/2002 | Smith .................. E21B 17/042 285/333 |
| 6,467,818 | B1 | 10/2002 | Snapp et al. |
| 6,729,658 | B2* | 5/2004 | Verdillon ............. F16L 15/004 285/333 |
| 6,799,664 | B1 | 10/2004 | Connolly |
| 7,078,623 | B1 | 7/2006 | Sheehan |
| 7,188,685 | B2 | 3/2007 | Downton et al. |
| 7,210,710 | B2* | 5/2007 | Williamson .......... E21B 17/042 285/333 |
| 7,416,374 | B2 | 8/2008 | Breihan et al. |
| 7,455,329 | B2 | 11/2008 | Muradov et al. |
| 8,763,725 | B2 | 7/2014 | Downton |
| 10,145,496 | B2* | 12/2018 | Li .......................... F16L 15/06 |
| 2002/0113436 | A1 | 8/2002 | Verdillon |
| 2005/0189147 | A1 | 9/2005 | Williamson et al. |
| 2006/0214421 | A1 | 9/2006 | Muradov |
| 2007/0131412 | A1 | 6/2007 | Finci et al. |
| 2007/0286694 | A1 | 12/2007 | Glimpel et al. |
| 2010/0018699 | A1 | 1/2010 | Hall et al. |
| 2010/0123311 | A1 | 5/2010 | Church |
| 2010/0308577 | A1 | 12/2010 | Chin |
| 2011/0012347 | A1 | 1/2011 | Pacheco |
| 2014/0333065 | A1 | 11/2014 | Pacheco |
| 2015/0362100 | A1 | 12/2015 | Li et al. |
| 2015/0367402 | A1 | 12/2015 | Singh et al. |
| 2016/0136721 | A1 | 5/2016 | Zhou |
| 2019/0060979 | A1 | 2/2019 | Singh et al. |

FOREIGN PATENT DOCUMENTS

| | | |
|---|---|---|
| EP | 2606992 A1 | 6/2013 |
| JP | H10238548 A | 9/1998 |
| KR | 1020120131020 | 12/2012 |

OTHER PUBLICATIONS

International Preliminary Report on Patentability issued in International Patent Application No. PCT/US2015/035527, dated Jan. 5, 2017, 12 pages.

International Search Report and Written Opinion issued in International Patent Application No. PCT/US2015/035451 dated Sep. 23, 2015, 16 pages.

International Preliminary Report on Patentability issued in International Patent Application No. PCT/US2015/035451, dated Dec. 22, 2016, 14 pages.

First Office Action and Search Report issued in Chinese Patent Application No. 201580034196.9 dated Jan. 3, 2018, 13 pages.

First Office Action and Search Report issued in Chinese Patent Application No. 201580031589.4 dated Feb. 2, 2018, 8 pages.

Second Office Action issued in Chinese Patent Application No. 201580031589.4 dated Sep. 30, 2018, 6 pages, includes English Translation.

Office Action issued in U.S. Appl. No. 14/737,451 dated Aug. 29, 2017, 8 pages.

Office Action issued in U.S. Appl. No. 14/737,443 dated Sep. 21, 2017, 6 pages.

Trishman, I.E., Method for the Improvement of Drill-collar Joints Evaluated by Full-size Fatigue Tests. Drilling and Production Practice, American Petroleum Institute, Jan. 1, 1952. New York, New York, 14 pages.

"Specification for Rotary Drill Stem Elements," ANSI/API Specification 7-1, Mar. 2006.

\* cited by examiner

THREADED CONNECTIONS AND DOWNHOLE TOOLS INCORPORATING THE SAME

CROSS REFERENCE TO RELATED APPLICATIONS

This application is a continuation-in-part of U.S. patent application Ser. No. 14/737,443, filed Jun. 11, 2015, which claims the benefit of, and priority to, U.S. Patent Application No. 62/012,232, filed on Jun. 13, 2014, both entitled "ROTARY SHOULDERED CONNECTIONS AND THREAD DESIGN", the contents of which are incorporated herein by reference in their entirety.

BACKGROUND

This section provides background information to facilitate a better understanding of the various aspects of the disclosure. It should be understood that the statements in this section of this document are to be read in this light, and not as admissions of prior art.

In downhole drilling, the drilling elements comprising a drilling tool are frequently coupled together by threaded structures. In these coupled drilling elements, the thread design is critical since failure often occurs in the thread structure. Whenever fatigue induced failure in the thread structure does occur, the initial crack starts at the thread root. This is due to the high stress concentrations located at the root of the threads when the thread structure is subject to severe loading.

SUMMARY

In some embodiments, a thread structure includes a bit body having a longitudinal axis and a thread extending helically along a portion of the bit body in spaced thread turns. The thread includes a crest and a root. The crest extends between a first flank and a second flank. The root extends between the thread turns. The root has a curvature defined by a portion of an ellipse tangentially adjoining the first and second flank at respective flank transition points. The ellipse has a major axis extending parallel to the longitudinal axis and a minor axis extending perpendicular to the major axis and through a root bottom.

In some embodiments, a rotary shouldered connection (RSC) includes a first downhole component with a pin end carrying a thread structure and a bit body with a box end carrying a thread structure. The first downhole component has a longitudinal axis, and the pin end and the box end are threadedly connected. The thread includes a crest and a root. The crest extends between a first flank and a second flank. The root extends between the thread turns. The root has a curvature defined by a portion of an ellipse tangentially adjoining the first and second flank at respective flank transition points. The ellipse has a major axis extending parallel to the longitudinal axis and a minor axis extending perpendicular to the major axis and through a root bottom.

In some embodiments, a drilling system includes a drill string with an RSC including a thread structure on a bit body. The bit body has a longitudinal axis. The thread structure includes a thread extending helically in spaced thread turns. The thread includes a crest and a root. The crest extends between a first flank and a second flank. The root extends between the thread turns. The root has a curvature defined by a portion of an ellipse tangentially adjoining the first and second flank at respective flank transition points. The ellipse has a major axis extending parallel to the longitudinal axis and a minor axis extending perpendicular to the major axis and through a root bottom.

This summary is provided to introduce a selection of concepts that are further described in the detailed description. This summary is not intended to identify key or essential features of the claimed subject matter, nor is it intended to be used as an aid in limiting the scope of the claimed subject matter. Additional features and aspects of embodiments of the disclosure will be set forth herein, and in part will be obvious from the description, or may be learned by the practice of such embodiments.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, non-schematic drawings should be considered as being to scale for some embodiments of the present disclosure. Understanding that the drawings depict some example embodiments, the embodiments will be described and explained with additional specificity and detail through the use of the accompanying drawings in which.

DETAILED DESCRIPTION

It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed.

As used herein, the terms connect, connection, connected, in connection with, and connecting may be used to mean in direct connection with or in connection with via one or more elements. Similarly, the terms couple, coupling, coupled, coupled together, and coupled with may be used to mean directly coupled together or coupled together via one or more elements. Terms such as up, down, top and bottom and other like terms indicating relative positions to a given point or element may be utilized to more clearly describe some elements. Commonly, these terms relate to a reference point such as the surface from which drilling operations are initiated.

Figure 1:
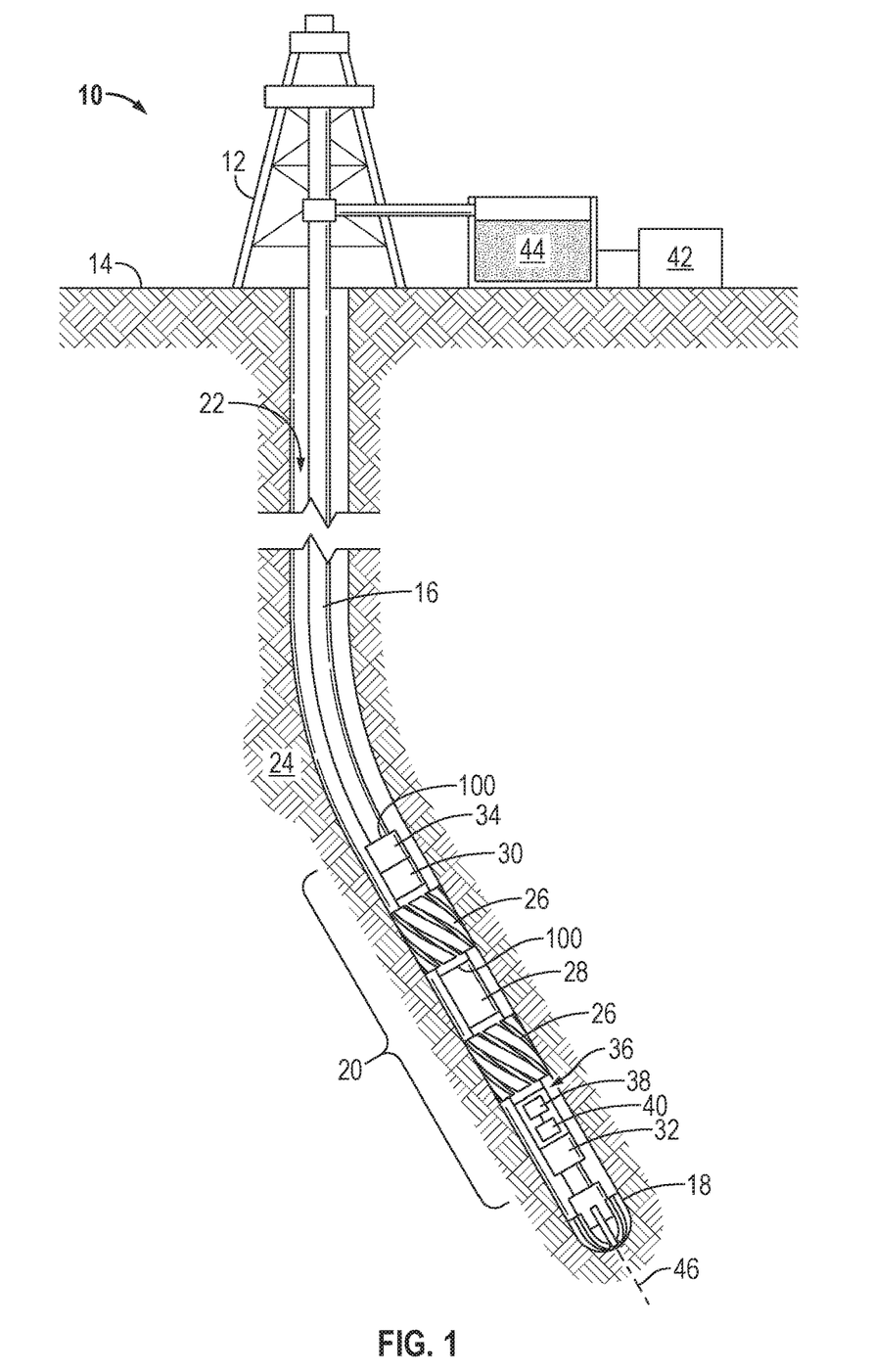
FIG. 1 is a drilling system incorporating a rotary shouldered connection, for example, a high dog-leg severity wellbore, according to some embodiments of the present disclosure.

FIG. 1 is a schematic illustration of an embodiment of a directional drilling system, generally denoted by the numeral 10, in which embodiments of rotary shouldered connections 100 may be incorporated. Directional drilling system 10 includes a rig 12 located at surface 14 and a drill string 16 suspended from rig 12. A drill bit 18 is disposed with a bottom hole assembly ("BHA") 20 and deployed on drill string 16 to drill (i.e., propagate) borehole 22 into formation 24.

The depicted BHA 20 includes one or more stabilizers 26, a measurement-while-drilling ("MWD") module or sub 28, a logging-while-drilling ("LWD") module or sub 30, and a steering device 32 (e.g., bias unit, RSS device, steering actuator, pistons, pads), and a power generation module or sub 34. The illustrated directional drilling system 10 includes a downhole steering control system 36, e.g. control unit or attitude hold controller, disposed with BHA 20 and operationally connected with steering device 32 to maintain drill bit 18 and BHA 20 on a desired drill attitude to propagate borehole 22 along the desired path (i.e., target attitude). Depicted downhole steering control system 36 includes a downhole processor 38 and direction and inclination ("D&I") sensors 40, for example, accelerometers and magnetometers. Downhole steering control system 36 may be a closed-loop system that interfaces directly with BHA 20 sensors, i.e., D&I sensors 40, MWD sub 28 sensors, and steering device 32 to control the drill attitude. Downhole steering control system 36 may be, for example, a unit configured as a roll stabilized or a strap down control unit. Although embodiments are described primarily with reference to rotary steerable systems, it is recognized that embodiments may be utilized with non-RSS directional drilling tools. Directional drilling system 10 includes drilling fluid or mud 44 that can be circulated from surface 14 through the axial bore of drill string 16 and returned to surface 14 through the annulus between drill string 16 and formation 24.

The tool's attitude (e.g., drill attitude) is generally identified as the axis 46 of BHA 20. Attitude commands may be inputted (i.e., transmitted) from a directional driller or trajectory controller generally identified as the surface controller 42 (e.g., processor) in the illustrated embodiment. Signals, such as the demand attitude commands, may be transmitted for example via mud pulse telemetry, wired pipe, acoustic telemetry, and wireless transmissions. Accordingly, upon directional inputs from surface controller 42, downhole steering control system 36 controls the propagation of borehole 22 for example by operating steering device 32 to steer the drill bit and to create a deviation, dogleg or curve in the borehole along the desired path. In particular, steering device 32 is actuated to drive the drill bit to a set point. The steering device or bias unit may be referred to as the main actuation portion of the directional drilling tool and may be categorized as a push-the-bit, point-the-bit, or hybrid device.

In point-the-bit devices, the axis of rotation of the drill bit 18 is deviated from the local axis of bottom hole assembly 20 in the general direction of the desired path (target attitude). The borehole is propagated in accordance with the customary three-point geometry defined by upper and lower stabilizer 26 touch points and the drill bit 18 touch point. The angle of deviation of the drill bit axis coupled with a finite distance between the drill bit and lower stabilizer results in the non-collinear condition required for a curve to be generated. There are many ways in which this may be achieved including a fixed bend at a point in the bottom hole assembly close to the lower stabilizer or a flexure of the drill bit drive shaft distributed between the upper and lower stabilizer.

In the push-the-bit rotary steerable system there is usually no specially identified mechanism to deviate the drill bit axis from the local bottom hole assembly axis; instead, the requisite non-collinear condition is achieved by causing either or both of the upper or lower stabilizers to apply an eccentric force or displacement in a direction that is preferentially orientated with respect to the direction of the borehole propagation. Again, there are many ways in which this may be achieved, including non-rotating (with respect to the hole) eccentric stabilizers (displacement based approaches) and eccentric actuators that apply force to the drill bit in the desired steering direction, e.g. by extending steering actuators into contact with the surface of the borehole. Again, steering is achieved by creating non co-linearity between the drill bit and at least two other touch points.

The drilling system may be of a hybrid type, for example having a rotatable collar, a sleeve mounted on the collar so as to rotate with the collar, and a universal joint permitting angular movement of the sleeve relative to the collar to allow tilting of the axis of the sleeve relative to that of the collar. Actuators control the relative angles of the axes of the sleeve and the collar. By appropriate control of the actuators, the sleeve can be held in a substantially desired orientation while the collar rotates. Non-limiting examples of hybrid systems are disclosed for example in U.S. Pat. Nos. 8,763,725 and 7,188,685.

The development of rotary steerable systems such as available under the POWERDRIVE™, e.g. the POWERDRIVE ARCHER®, trademark from Schlumberger Technology Corporation, has enabled the execution of high dog leg severity (DLS) drilling. As a result of the elevated degree of DLS, the bottom hole assembly (BHA) 20 components in the drill string 16 are subjected to higher bending cyclical loads. In turn, the increase in dynamic bending loads shortens the fatigue life of the components and failures occur, e.g., twist-off failures. Abundant field experience and theoretical analysis have shown that most fatigue failures occur at the rotary shouldered connections (RSCs) located at each end of the BHA components. Traditionally, the RSCs used have been standard API tapered threaded connections. While standard API threaded joints are widely used in the drilling industry, their fatigue strength is too low to meet the requirements imposed by the high DLS market.

Figure 2:
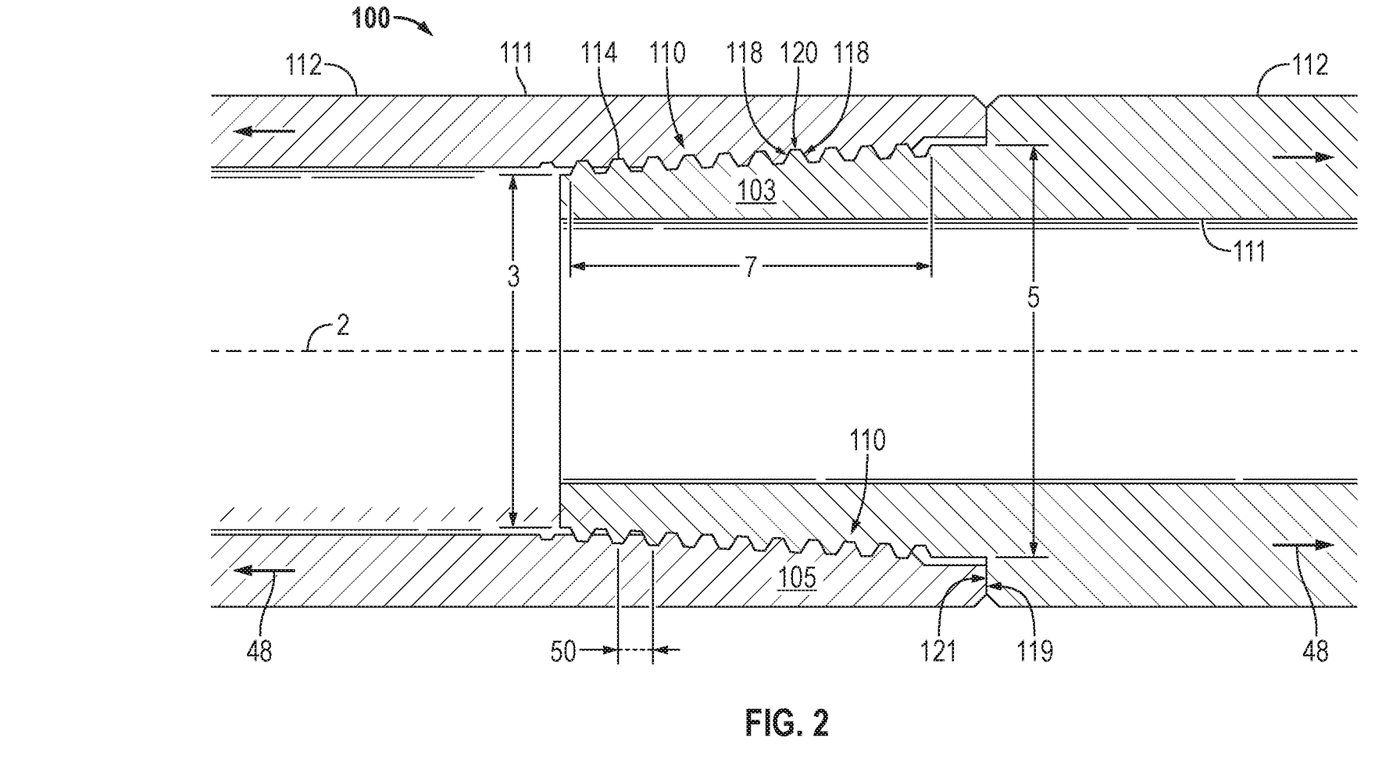
FIG. 2 is a cross-sectional view illustrating a rotary shouldered connection, according to some embodiments of the present disclosure.

When fatigue failure occurs in the threaded connection, the crack tends to initiate at the thread root of the weaker member (pin or box). An optimized root design is critical to reducing stress concentration in the root, thereby enhancing fatigue strength. FIG. 2 illustrates a threaded, rotary shouldered connection (RSC) 100 in accordance to one or more embodiments having a thread structure 110 design for high-DLS (dog-leg severity) field joints, i.e. connections. Rotary shouldered connection 100 includes a pin end 103 of a member 112 having external thread structures 110 and a box end 105 of another member 112 having internal thread structures 110. Members 112 are cylindrical or tubular support members, e.g., pipe, collars, steering bias unit. The RSC 100 is illustrated in FIG. 2 made-up with the pin end shoulder 119 and the box end shoulder 121, e.g., contact surfaces, contacting one another. The threaded connection is subject to a tensile load 48 along the longitudinal axis 2-2 of the connection. With reference to FIG. 1, rotary shouldered connection 100 is described in particular with reference to the bottom hole assembly 20, however, rotary shouldered connections 100 may be utilized throughout the drill string 16.

Figure 3:
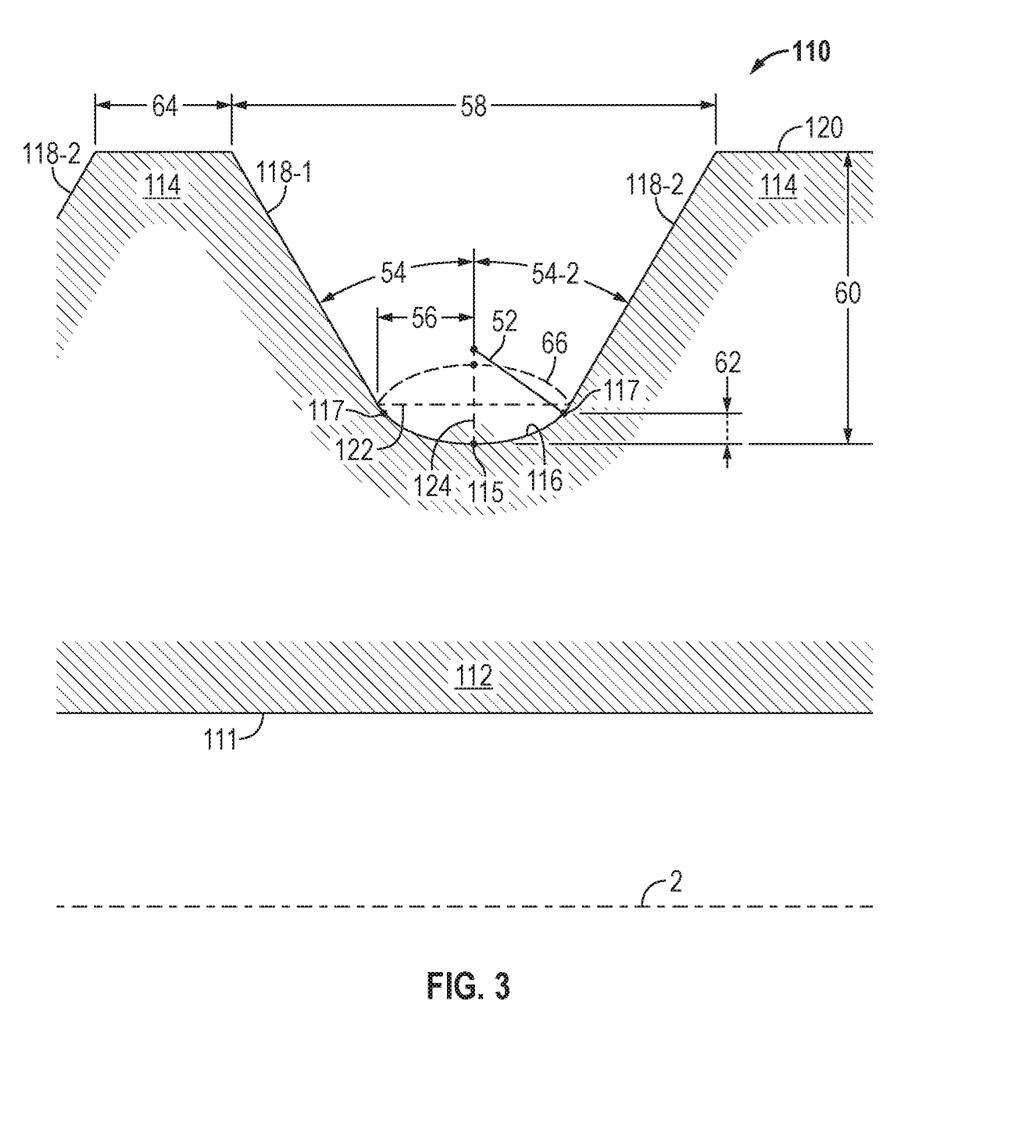
FIG. 3 is a profile view of a thread structure and a thread root, according to some embodiments of the present disclosure.

FIG. 3 illustrates a thread structure 110 in accordance to one or more embodiments. With continued reference in particular to FIGS. 2 and 3, RSC 100 has a tangential elliptical thread root portion 116 design with an optimized root depth 62 and thread parameters such as pitch 50, equivalent root radius 52, and flank angle 54 which corresponds to flank 118-1 in FIG. 3. The flank angle of the flank 118-2 on the opposite side of root portion 116 is identified with the reference number 54-2. As will be understood by those skilled in the art with benefit of the disclosure flank angles 54 and 54-2 may be the same or different. Analytical and numerical results indicate that the rotary shouldered connection 100 thread designs significantly increase the BHA connection life under high-DLS conditions compared to commonly used standard API threads. For example, at 15 deg./100 ft DLS, a minimum factor 4 enhancement in fatigue life is predicted compared to NC38 thread, which is the most commonly used API connection for example for 4.75 inch tools.

At least one thread 114 extends helically along the cylindrical support member 112 in spaced thread turns. Thread 114 may be a single start helix or a double start helix. The thread structure may have a taper described for example as a uniform change in the diameter of a work piece measured along its axis and measured for example in taper per foot, taper per inch, in degrees, and for example in the metric system as a ratio of diameter change over length. With reference to FIG. 2 a taper may be defined in terms of the change in diameter between first diameter 3 and second diameter 5 along the length 7. The thread structure may have a pitch 50, shown from crest to crest in FIG. 2, identified in terms of threads per length or distance between crests. For example, a rotary shouldered connection having three threads per inch (TPI) may also be referred to as having a pitch of 1"/3 or 0.3336 inch.

Wall surface 111 represents the external cylindrical surface of a box end 105 thread structure 110 or the central bore surface of a pin end 103 thread structure 110. A thread root portion 116 is located between adjacent threads 114, i.e. adjacent thread turns. The root portion 116 has a root bottom 115 and a curved surface extending between flank transition points 117. Thread structure 110 includes flanks, generally identified with reference number 118 and specifically as 118-1 and 118-2, on opposing sides of crest 120. One of flank 118-1 and 118-2 may be load bearing, e.g., 118-1, and the other of flank 118-1 and 118-2 a non-load bearing, or stab, flank, e.g., 118-2. When the thread structure is subject to loading the forces will be transmitted between coupled pin end 103 and box end 105 thread structures via contiguous mating load bearing flanks 118-1 of the respective pin and box threads, see e.g., FIG. 2.

FIG. 3 depicts a thread structure 110 having a tangential elliptical root portion 116 design. The depicted root portion 116 has a curvature defined by a portion of an ellipse 66, tangentially adjoining the two flanks 118, a load bearing flank 118-1 and a non-load bearing flank 118-2, of the adjacent threads 114, i.e. thread turns, at flank transition points 117. The ellipse 66 has a major axis 122 and a shorter minor axis 124 extending perpendicularly from the major axis. The major axis 122 extends parallel with the longitudinal axis 2-2 of the support member 112. Minor axis 124 extends radially outward and perpendicular from the support member 112, e.g., perpendicular to the axis 2-2. For example, minor axis 124 may extend radially outward from root bottom 115. The root depth 62 extends from the flank transition point 117 to the root bottom 115. In FIG. 3, the major axis 122 is illustrated vertically offset from intersecting the transition points 117 and positioned vertically above the transition point 117 relative to the root bottom 115.

The transition points 117 are points of tangency of the extending flanks 118 with the ellipse 66. The flank angles 54 of the adjacent flanks 118 separated by root portion 116 or the flanks separated by crest 120 may be equal or different. In FIG. 3, the flank angle 54 of adjacent load bearing and non-load bearing flanks are equal and the surface area of the load flank bearing and non-load bearing flank are equal. In some embodiments, the flank angles of the adjacent load and non-load flanks may be different. The depicted root portion 116 curvature is symmetric, however the root curvature may be asymmetric.

With reference to FIGS. 2 and 3, thread structure 110 includes the thread parameters described in Table 1 below.

TABLE 1

| Name | Symbol | Reference No. |
| --- | --- | --- |
| Pitch | | 50 (FIG. 2) |
| Equivalent Root Radius | R | 52 (FIG. 3) |
| Flank Angle | FA | 54 (FIG. 3) |
| Root Semi-Width at Flank Transition Point | SW (SW = Rcos(FA)) | 56 (FIG. 3) |
| Root Width at Crest | RW (RW = Pitch − (Crest Width)) | 58 (FIG. 3) |
| Truncated Thread Height | TH (TH = [RW/2 − Rcos(FA)]/tan(FA) + RD) | 60 (FIG. 3) |
| Root Depth between Flank Transition Points 117 and Root Bottom 115 | RD | 62 (FIG. 3) |
| Crest Width | | 64 (FIG. 3) |

The thread structure 110 of RSC 100 has larger pitch 50 and larger equivalent root radius 52, and smaller flank angle 54, relative to a round root configuration for example of a standard API NC38 thread, to reduce stress concentration in the root portion 116 and maintain shear resistance and galling resistance of the thread. Various root designs such as circular, tangential ellipse, non-tangential ellipse, and cubic spline are contemplated, and finite element analysis (FEA) of a notched specimen indicates that using a tangential elliptical shape is most effective in reducing stress concentration in the root portion.

Figure 4:
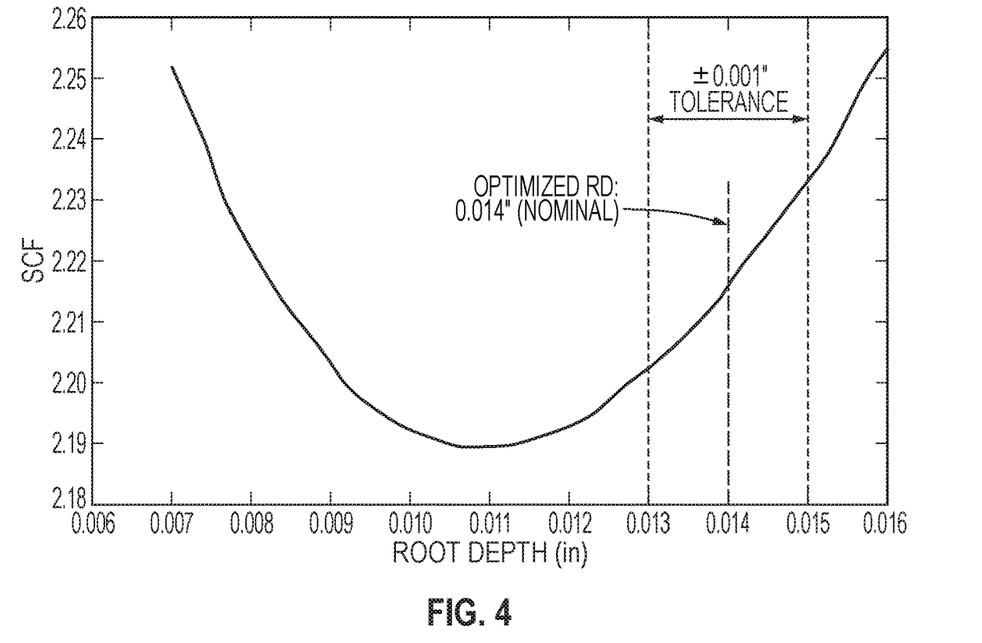
FIGS. 4 and 5 graphically illustrate stress characteristics of a thread root, according to some embodiments of the present disclosure.
Figure 5:
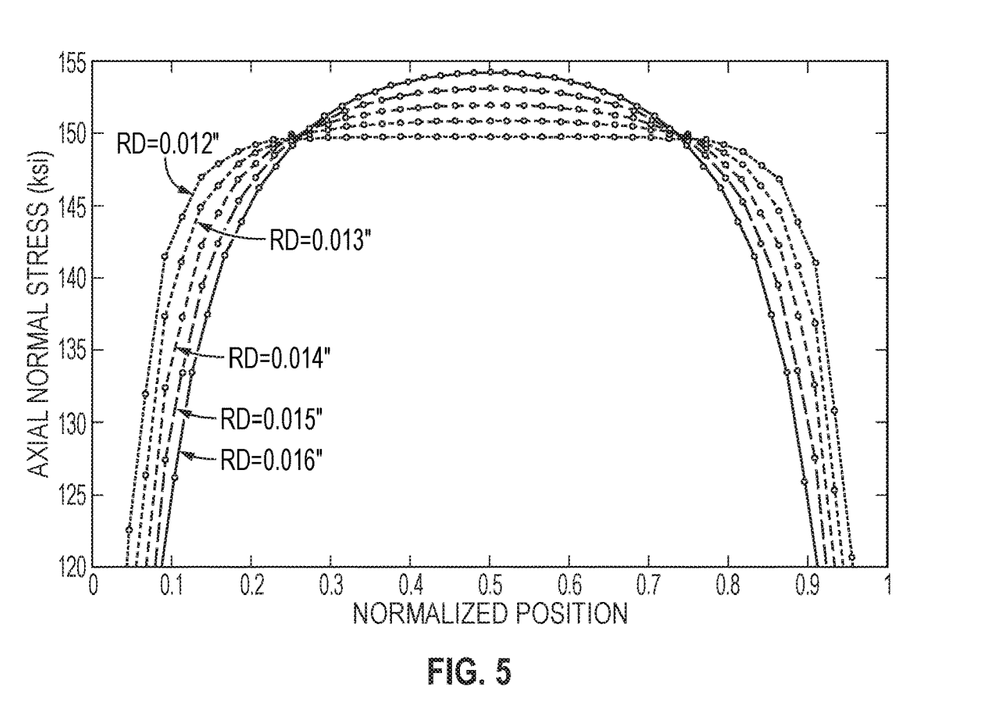

In accordance with some aspects, the root portion 116 in the thread structure 110 has an equivalent root radius 52 defined by a portion of an ellipse 66, tangentially adjoining the two flanks 118 of the adjacent threads 114, see e.g. FIG. 3. The "equivalent radius" or "equivalent root radius" is the local radius of the ellipse at the transition point where the flank 118 is tangent to the ellipse 66, i.e., transition point 117. With reference to FIG. 3, the equivalent radius 52 extends at a right angle to the flank at the tangent point 117 to the ellipse center which corresponds to minor axis 124 in FIG. 3. The thread structure 110 with an equivalent root radius 52 that is longer than a circular or round radius provides a greater relief in stress concentration in the root. For a given root semi-width 56, the root depth 62 can be optimized such that the peak stress is maintained in the middle of the root portion 116, with the manufacturing tolerance considered (e.g. machined or cold rolled). For example, the nominal dimensions in the proximity of a root depth 62 of about 0.014 inch (RD=0.014 inch) if machined, or about 0.015 inch if cold rolled, and a root semi-width 56 of about 0.53 inch (SW=0.053 inch) are illustrated in FIGS. 4 and 5. FIG. 4 illustrates the root depth 62 plotted against a stress concentration factor (SCF). Stress concentration factor (SCF) may for example be a local peak alternating stress in a component divided by the nominal alternating stress in the pipe wall at the location of the component. FIG. 5 illustrates a normalized position against the axial normal stress in kilopounds per square inch (ksi) for various dimensions of root depth 62 in inches.

FEA results demonstrate that thread structure 110 has the similar tensile/shear capacity as standard API NC38 thread. A summary of non-limiting examples of primary thread parameters of thread structures 110 in accordance to one or more embodiments are listed in in Table 2.

TABLE 2

| | |
|---|---|
| Root Semi-Width 56 | ~0.050 to ~0.061 inch |
| Equivalent Root Radius 52 | ~0.057 to ~0.061 inch |
| Flank Angle 54 | ~20° to ~30° |
| Crest Width 64 | ~0.1 to ~0.2 inch |
| Root Depth 62 | ~0.012 to ~0.020 inch |
| Semi-Major Axis 122 | ~0.050 to ~0.055 inch |
| Semi-Minor Axis 124 | ~0.013 to ~0.020 inch |
| Taper (T.P.F.) | ~1.0 to ~1.5 taper per foot |
| Pitch (T.P.I.) 50 | ~3 threads per inch |

In accordance to one or more aspects, the characteristics of a rotary shouldered connection 100 includes a thread structure 110 having a tangential elliptical root portion 116 design with one or more of an equivalent root radius 52 of approximately 0.059 inch and a root depth 62 of approximately 0.014 inch, a single-start helix thread 114, pitch 50 of about 3 threads per inch, taper of about 1.25 taper per foot, and a flank angle 54 of about 25 degrees, for example the flank angle 54 of flank 118-1 in FIG. 3, a semi-major axis length of about 0.053 inch and a semi-minor axis length of about 0.016 inch. The flank angles 54 and 54-2 may be the same or different. In accordance to some embodiments a life enhancement minimum factor of 2 to 4 based on connection FEA. The average contact pressure on the load bearing flank 118-1 induced by makeup torque (MUT) may increase by about 6 to 15 percent. The average contact pressure on a shoulder 119, 121, e.g., induced by MUT, may increase by about 8 to 10 percent. Sealing may improve relative to the API standard NC38 thread. The thread structure 110 may have similar tensile capacity and shear capacity to the API standard NC38 thread. In accordance to some aspects, compressive treatments such as shot-peening and cold-rolling may be applied to the thread structure to further improve fatigue life of the threads.

In accordance to one or more aspects, the thread structure 110 may have an equivalent root radius 52 of about 0.057 inch to about 0.061 inch, a flank angle 54 of about 20 to about 30 degrees, a crest width 64 of about 0.1 to about 0.2 inch, and a root depth 62 of about 0.012 to about 0.020 inch. The thread structure 110 may have a root semi-width 56 at flank transitions points of about 0.050 to about 0.060, a pitch 50 of about three threads per inch, and a taper of about 1.0 to about 1.5 taper per foot. The major axis 122 may have a semi-major axis length for example of about 0.050 inch to about 0.055 inch and a semi-minor axis 124 length of about 0.013 to about 0.020 inch.

In accordance to one or more embodiments, a thread structure 110 has a tangential elliptical root portion 116 geometry with an equivalent root radius of about 0.057 inch to about 0.061 inch, a flank angle of about 25 to about 27.5 degrees, and a root depth of about 0.014 to about 0.016 inch.

Figure 6:
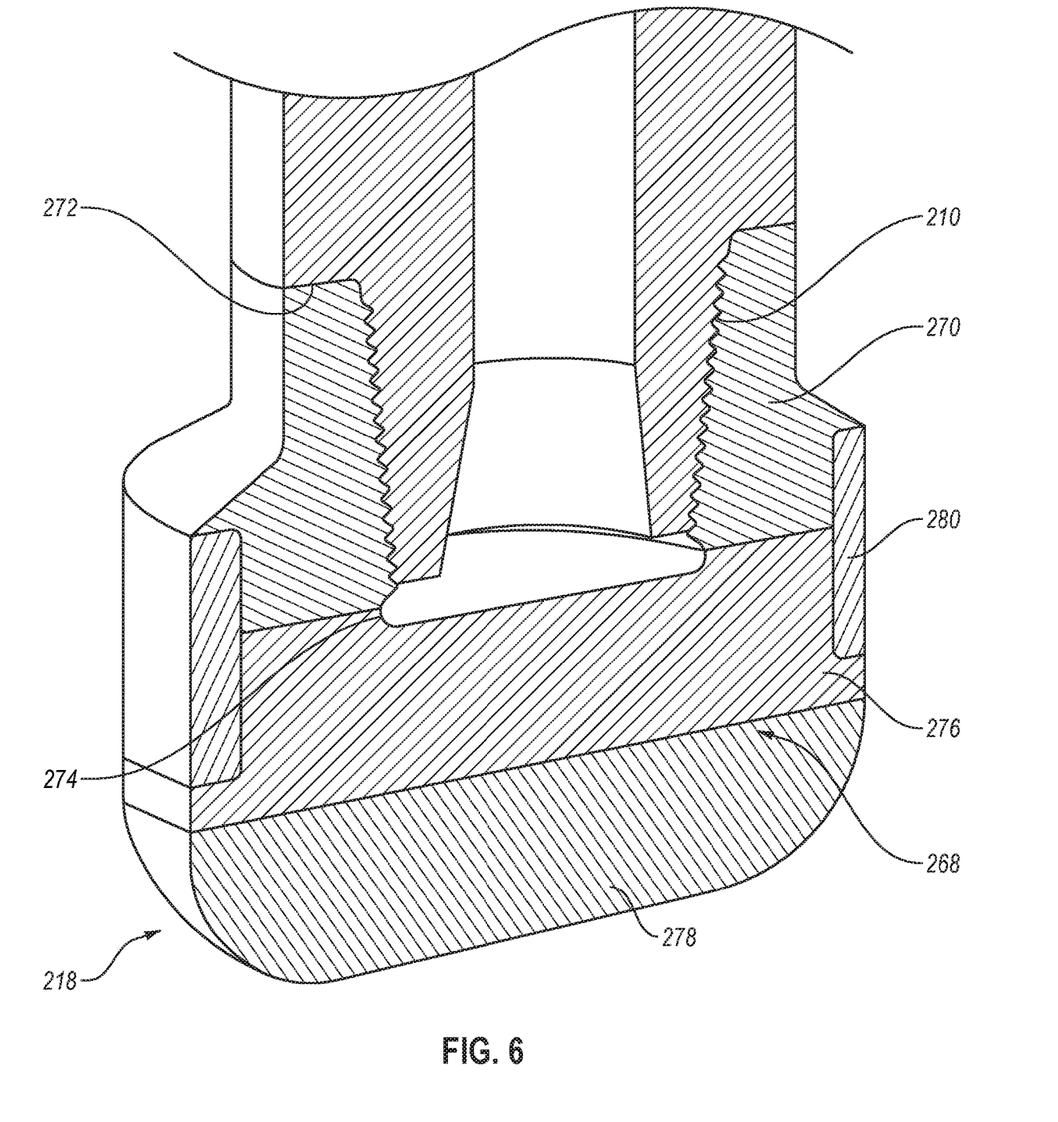
FIG. 6 is a perspective, cross-sectional view of a bit, according to some embodiments of the present disclosure.

FIGS. 2 and 3 illustrate an embodiment of a thread and/or threaded connection between tubular components of a drilling system. In other embodiments, a thread and/or threaded connection according to the present disclosure may connect a bit to another downhole component of a drilling system. FIG. 6 is a side cross-sectional view of an embodiment of a bit 218 having a thread structure 210 according to the present disclosure. The bit 218 is shown somewhat schematically, as cutting elements (e.g., polycrystalline diamond cutting elements, impregnated cutting elements, or roller cones) are not shown. One skilled in the art will appreciate, however, that cutting elements may be included in the bit 218, such as by using a cutter pocket, a bit leg, or the like.

The bit 218 may be connected to a steering device 232 or to another downhole component of a drill string, such as a bias or rotary steerable unit. The bit 218 may include a bit body 268 that includes the thread structure 210. In some embodiments, the bit body 268 may have the thread structure located within the bit body 268 (i.e., a threaded box). In other embodiments, the bit body 268 may have the thread structure located externally to the bit body 268 (i.e., a threaded pin).

The bit 218 may have a monolithic bit body 268 that includes or is made of a ferrous alloy, a nickel-based alloy, a tungsten alloy, other metal alloys, a carbide, or combinations thereof. In other embodiments, the bit body 268 may be a multi-piece bit body with a plurality of materials joined together to create the bit body 268 with the different materials positioned different locations within the bit body 268. FIG. 6 illustrates such an embodiment of a bit 218 with multiple materials forming the bit body 268. For instance, the bit 218 may include four different materials. In other embodiments, the bit 218 may include more than four materials, and in yet other embodiments, the bit 218 may include fewer than four materials.

The embodiment depicted in FIG. 6 includes a bit 218 including a first material 270 adjacent the thread structure 210. In some embodiments, the first material 270 may include steel, tungsten or tungsten alloys, nickel or nickel alloys, other metals, or combinations thereof to provide sufficient toughness to the thread structure 210 and limit and/or prevent cracking of the thread structure 210. In at least one example, the first material 270 may more easily machined to include thread structure 210, when compared to some or each of the second, third, and fourth materials 276, 278, 280 of the bit 218. By way of example, the first material 270 may be formed of a composition including between 90 wt % and 95 wt % tungsten particles, and approximately 3 wt % to 8 wt % nickel. Any remainder may include other materials, such as iron, carbon, oxygen, other materials, or combinations of the foregoing. In one example, the composition used to form the first material 970 may be between 92 wt % and 94 wt % tungsten particles, between 4.5 wt % and 7.5 wt % nickel particles, with less than 1 wt % made of iron and oxygen. With greater than 95 wt % metal (and indeed, potentially greater than 99 wt % metal), the first material 270 may provide a sufficiently strong and tough thread structure 210. In at least some embodiments, the powder used to form the first material 270 is substantially devoid (e.g., less than 2 wt % or 5 wt %) of tungsten carbide. The material may extend from a connection end 272 of the bit 218 to a plenum 274.

The first material 270 may be joined to a second material 276 of the bit body 268. The second material may be metallurgically compatible with the first material 270 allowing the first material 270 and second material 276 to be bonded and/or integrally formed with one another. For example, the first material 270 and second material 276 may be sintered together with a nickel, iron, copper, or other metal binder to microstructurally bond at least a portion of the first material 270 to at least a portion of the second material 276. In at least one example, the second material 276 may be formed of a composition having a greater wear resistance than the first material 270. For instance, the second material 276 may be formed of a composition including carbide, a ceramic, a superalloy, or combinations thereof. In at least one example, the second material 276 may be formed from a powder including carbide. For instance, the powder forming the second material 276 may include including 87-97 wt % tungsten carbide, and 3-13 wt % of a nickel-based composition that is more than 99 wt % nickel. For instance, the powder forming the second material 276 may be formed of 90-94 wt % tungsten carbide, and 6-10 wt % of a nickel composition that is more than 99.5 wt % nickel, with the remainder being made of carbon, oxygen, other elements, or combinations thereof. The second material 276 may provide higher erosion resistance than the first material 270, while the first material 270 may exhibit greater toughness, plasticity, or the like. As shown in FIG. 6, the second material 276 may extend generally from the interface with the first material 270 (e.g., about at the plenum), toward the bit face. In at least some embodiments, the second material 276 extends at least 50% between the plenum and the downhole end of the blades of the bit 218. In one or more embodiments, the second material 276 extends at least 75% from the plenum to the downhole end of the blades of the bit 218. In at least some embodiments, the second material 276 extends between 85% and 100% of the distance from the plenum to the bit face, and the third material 278 makes up the blades of the bit 218.

In some embodiments, the bit body 268 includes the third material 278 at the distal or downhole end of the bit 218. The third material 278 may include even greater wear and/or erosion resistance than either the first material 270 and/or the second material 276. For example, the third material 278 may interface the second material and have a greater erosion resistance than the second material 276 providing a hardness that increases from the second material 276 to the third material 278, and thus in a longitudinal direction of the bit body 268. For example, the third material 278 may include or be made of a tungsten carbide, a polycrystalline diamond, a cubic boron nitride, a titanium nitride, or other material with a greater erosion resistance than the first material 270 and/or second material 276. In at least one embodiment, the third material 278 may be formed of a powder including about 88-95 wt % tungsten carbide and about 5-12 wt % of a nickel-based composition. For instance, the third material 278 may include 91-93 wt % tungsten carbide and 7-9 wt % of a nickel-based composition that is at least 99 wt % nickel. In at least some embodiments, carbon and oxygen make up less than 1 wt % of the nickel-based composition.

According to at least some embodiments, the type of tungsten carbide used in the second and third materials 276, 278 may provide increased wear or erosion resistance to the third material 278. For instance, the third material 278 may include a higher percentage of cast tungsten carbide, which may have higher wear or erosion resistance than stochiometric tungsten carbide used in the second material 276. In at least some embodiments, less than 40 wt % (or even less than 30 wt %) of the second material 276 is cast tungsten carbide, while at least 60 wt % (or even at least 85 wt %) of the third material 278 is cast tungsten carbide. The third material 278 may provide a very high wear and/or erosion resistance and may be used to form the blades of the bit 218. In the same or other embodiments, the tungsten carbide or other hard particles of the third material 278 may have an average size that is larger than those of the second material 278. For instance, the average particle size of the hard particles of the third material 278 may be at least 10%, at least 25%, at least 50%, or at least 100% larger than the average particle size of the hard particles of the second material 276.

In some embodiments, the bit body 268 may include a fourth material 280 positioned on the gauge surface of the bit body 268. For example, the fourth material 280 may be positioned generally to define a gauge pad, and to protect the gauge pad from abrasion and to allow the first material 270 to extend a greater height within the bit 218. In particular, one or more gauge pads of the bit 218 may be in axial alignment with at least a portion of the first material 270 (and as shown in FIG. 6, may also be in axial alignment with at least a portion of the second material 276). In some embodiments, the fourth material 280 may extend a full height of the first material 270, such as where the gauge pad extends fully to the connection end 272 of the bit body 268, rather than having a taper or reduced exterior diameter at the connection end 272. The first and/or second materials 270, 276 optionally do not provide desirable wear or erosion resistance for gauge pads that contact the formation, or which are exposed to cuttings and external erosion. The fourth material 280 may be made of a higher wear or erosion resistant material and positioned on at least the exterior surfaces of the gauge pads. The fourth material 280 may be formed of a powder including tungsten carbide and may have a wear or erosion resistance similar to, or greater than, that of the second or third materials 276, 278. In at least some embodiments, the fourth material 280 is a moldable material that can be adhered to a surface of a mold used to form the bit 218. Each of the first, second, third, and fourth materials may be joined through a sintering process. For instance, a common infiltrant may infiltrate each of materials 270, 276, 278, 280 during the sintering process.

In at least some embodiments, the bit 218 is a fixed cutter bit and includes cutting elements within pockets formed on blades of the bit body 268. In at least some embodiments, the cutting element pockets are formed in the second, third, and fourth materials 276, 278, and 280. In the same or other example embodiments, cutting element pockets are formed in the first material 270. It at least some embodiments, a cutter pocket is formed in a gauge pad or other region where the fourth material 280 overlaps the first material 270, such that the cutter pocket is formed in both the first and fourth materials 270, 280.

Figure 7:
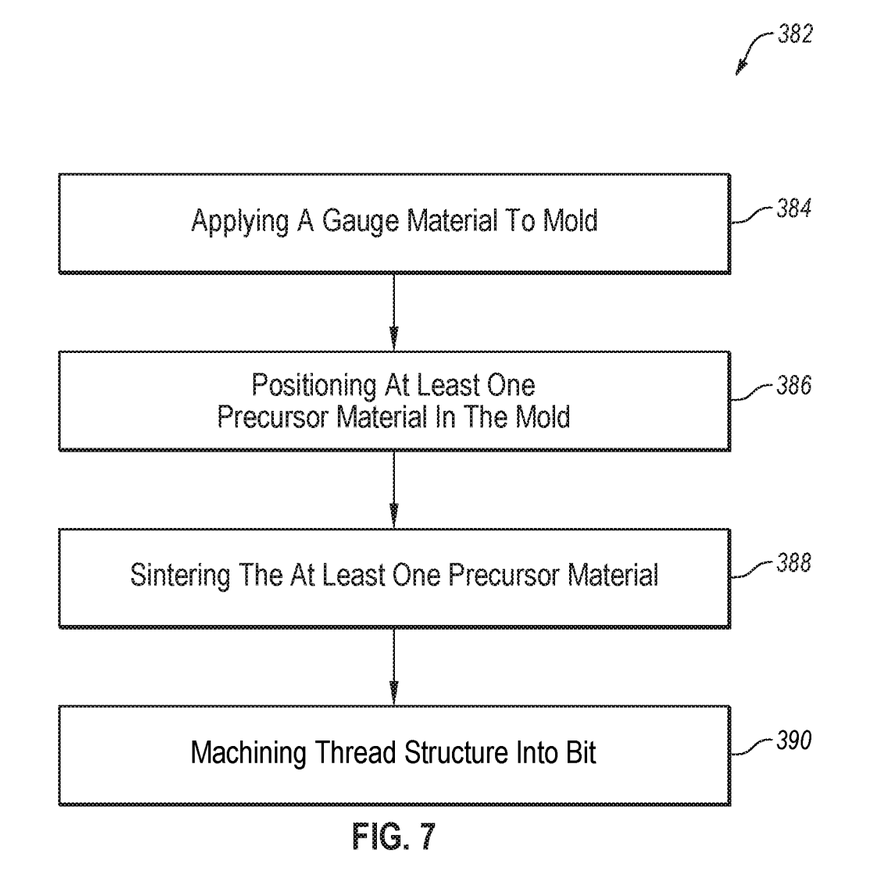
FIG. 7 is a flowchart of a method of manufacturing a bit having a rotary shouldered connection.

FIG. 7 is a flowchart depicting an embodiment of a method 382 of manufacturing a bit, such as the bit 218 of FIG. 6. In some embodiments, a method 382 manufacturing of the bit is performed by applying a gauge material, such as the fourth material 280 of FIG. 6, as a paste/putty to the gauge pad regions of a mold at 384. A powder, fluid, mixture, or other precursor material may then be then positioned in the mold at 386. In some embodiments, a series of precursor materials may be layered into the mold. For example, precursors (e.g., powders) of the third material, second material, and first material as described in relation to FIG. 6, may be layered or otherwise positioned in the mold to create the third material, second material, and first material, respectively, upon sintering. In at least one example, the third material precursor is a powder and positioned in the mold at least partially in a blade region of the mold, and the second material precursor is a powder and is placed on top of the third material precursor powder, up to the plenum of the bit. A first material precursor that is a powder may then fill the remainder of the mold. Infiltration binder materials may also be included to melt and infiltrate the precursor material(s) of the bit during the sintering process.

In some embodiments, the method 382 further includes sintering the gauge material and the at least one precursor material at 388. In some embodiments, sintering the at least one precursor includes sintering at a sintering temperature greater than 500° C. In the same or other embodiments, sintering the at least one precursor includes sintering at a sintering temperature greater than 700° C. In yet the same or additional embodiments, sintering the at least one precursor includes sintering at a sintering temperature greater than 1000° C.

In some embodiments, the at least one precursor material forms a machinable, hard matrix when infiltrated and sintered, and the thread structure is machined after the bit body is infiltrated at 390. The thread structure machined into the machinable, hard matrix may include one or more aspects of the embodiments of a thread structure described herein, including threadforms described with respect to FIGS. 2-5.

One or more specific embodiments of the present disclosure are described herein. These described embodiments are examples of the presently disclosed techniques. Additionally, in an effort to provide a concise description of these embodiments, not all features of an actual embodiment may be described in the specification.

Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein, to the extent such features are not described as being mutually exclusive. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

The terms "approximately," "about," and "substantially" as used herein represent an amount close to the stated amount that is within standard manufacturing or process tolerances, or which still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims. The described embodiments are therefore to be considered as illustrative and not restrictive, and the scope of the disclosure is indicated by the appended claims rather than by the foregoing description.

What is claimed is:

1. A downhole tool, comprising:
   a body having a longitudinal axis;
   a thread extending helically along an uphole portion of the body in spaced thread turns, the thread comprising:
      a crest extending between a first flank and a second flank;
      a root extending between the thread turns, the root having a curvature defined by a portion of an ellipse tangentially adjoining the first and second flank at respective flank transition points, the ellipse having a major axis extending parallel to the longitudinal axis and a minor axis extending perpendicular to the major axis and through a root bottom; and
      a root semi-width at the flank transition points of 0.050 inch to 0.061 inch.

2. The downhole tool of claim 1, the thread further comprising:
   an equivalent root radius of 0.057 inch to 0.061 inch; and
   a root depth of 0.012 inch to 0.020 inch.

3. The downhole tool of claim 2, wherein the root depth is 0.013 inch to 0.016 inch.

4. The downhole tool of claim 1, the root semi-width at the flank transition points being between 0.050 inch and 0.055 inch, and the thread further comprising:
   an equivalent root radius of 0.057 inch to 0.061 inch; and
   a root depth of 0.012 inch to 0.016 inch.

5. The downhole tool of claim 4, wherein the root depth is 0.014 inch to 0.015 inch.

6. The downhole tool of claim 1, the root semi-width at the flank transition points being between 0.050 inch and 0.060 inch, and the thread further comprising:
   a root depth of 0.012 inch to 0.020 inch; and
   a pitch of three threads per inch.

7. The downhole tool of claim 1, the root semi-width at the flank transition points being between 0.050 inch and 0.055 inch, and the thread further comprising:
   a root depth of 0.013 inch to 0.016 inch; and
   a pitch of three threads per inch.

8. The downhole tool of claim 1, the thread further comprising:
   an equivalent root radius of 0.057 inch to 0.061 inch;
   a first flank angle relative to the minor axis of 20° to 30°;
   a root depth of 0.012 inch to 0.020 inch;
   a pitch of three threads per inch; and
   a taper of 1.0 to 1.5 tapers per foot.

9. The downhole tool of claim 1, the root semi-width at the flank transition points being between 0.052 inch and 0.055 inch, and the thread further comprising:

an equivalent root radius of 0.057 inch to 0.059 inch;
a first flank angle relative to the minor axis of 24° to 28.5°;
a root depth of 0.013 inch to 0.016 inch;
a pitch of three threads per inch; and
a taper of 1.0 to 1.5 tapers per foot.

10. The downhole tool of claim 1, the thread further comprising:
an equivalent root radius of 0.057 inch to 0.059 inch;
a first flank angle relative to the minor axis of 24° to 28.5°;
a crest width of 0.1 inch to 0.2 inch; and
a pitch of three threads per inch.

11. A threaded connection, comprising:
a first downhole component having a longitudinal axis and a pin end carrying a thread structure;
a bit body having a box end carrying a thread structure, wherein the pin end and the box end are threadedly connected; and
the thread structure including a thread extending helically in spaced thread turns, the thread comprising:
    a crest extending between a first flank and a second flank;
    a root extending between the thread turns, the root having a curvature defined by a portion of an ellipse tangentially adjoining the first and second flank at respective flank transition points, the ellipse having a major axis extending parallel to the longitudinal axis and a minor axis extending perpendicular to the major axis and through a root bottom; and
    an equivalent root radius of 0.057 inch to 0.061 inch.

12. The threaded connection of claim 11, the thread further comprising:
a root semi-width at the flank transition points of 0.050 inch to 0.061 inch; and
a root depth of 0.012 inch to 0.020 inch.

13. The threaded connection of claim 11, the equivalent root radius being 0.057 inch to 0.059 inch, and the thread further comprising:
a first flank angle relative to the minor axis of 24° to 28.5°;
a crest width of 0.1 inch to 0.2 inch; and
a pitch of three threads per inch.

14. The threaded connection of claim 11, the thread further comprising:
a root semi-width at the flank transition points of 0.050 inch to 0.061 inch;
a first flank angle relative to the minor axis of 20° to 30°;
a root depth of 0.012 inch to 0.020 inch;
a pitch of three threads per inch; and
a taper of 1.0 to 1.5 tapers per foot.

15. The threaded connection of claim 11, the equivalent root radius being 0.057 inch to 0.059 inch, and the thread further comprising:
a root semi-width at the flank transition points of 0.052 inch to 0.055 inch;
a first flank angle relative to the minor axis of 24° to 28.5°;
a root depth of 0.013 inch to 0.016 inch;
a pitch of three threads per inch; and
a taper of 1.0 to 1.5 tapers per foot.

16. A drilling system, comprising:
a drilling string including a cutting tool body having a thread structure, the thread structure including a thread extending helically in spaced thread turns, the thread comprising:
    a crest extending between a first flank and a second flank;
    a root extending between the thread turns, the root having a curvature defined by a portion of an ellipse tangentially adjoining the first and second flank at respective flank transition points, the ellipse having a major axis extending parallel to a longitudinal axis of the cutting tool body and to a minor axis extending perpendicular to the major axis and through a root bottom;
    a root semi-width at the flank transition points of 0.050 inch to 0.061 inch; and
    an equivalent root radius of 0.057 inch to 0.061 inch.

17. The system of claim 16, the thread further comprising:
a root depth of 0.012 inch to 0.020 inch.

18. The system of claim 16, the equivalent root depth being between 0.057 inch and 0.059 inch, and thread further comprising:
a first flank angle relative to the minor axis of 24° to 28.5°;
a crest width of 0.1 to 0.2 inch; and
a pitch of three threads per inch.

19. The system of claim 16, the root semi-width at the flank transition points being between 0.052 inch and 0.055 inch, the equivalent root radius being between 0.057 inch and 0.055 inch, and the thread further comprising:
a first flank angle relative to the minor axis of 24° to 28.5°;
a root depth of 0.013 inch to 0.016 inch;
a pitch of three threads per inch; and
a taper of 1.0 to 1.5 tapers per foot.

20. The system of claim 16, wherein the cutting tool body is a matrix drill bit body and includes a first material in which the thread structure is formed, the first material extending to at least about a plenum of the drill bit body, the first material being formed of first precursor that is at least at least 90 wt % tungsten, the matrix drill bit body further including a plurality of gauge pads that are axially aligned with the first material, the plurality of gauge pads being formed of a second material having higher wear resistance than first material.

* * * * *